US 8,994,965 B2

(12) United States Patent
Motosugi

(10) Patent No.: US 8,994,965 B2
(45) Date of Patent: Mar. 31, 2015

(54) IMAGE FORMING APPARATUS AND OPERATION CONTROLLING METHOD OF THE SAME

(75) Inventor: Toshihisa Motosugi, Okazaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/163,459

(22) Filed: Jun. 17, 2011

(65) Prior Publication Data
US 2011/0310424 A1 Dec. 22, 2011

(30) Foreign Application Priority Data
Jun. 22, 2010 (JP) .................. 2010-141234

(51) Int. Cl.
G06F 3/12 (2006.01)
H04N 1/407 (2006.01)
G06F 3/033 (2013.01)
G09G 5/00 (2006.01)
G06K 9/18 (2006.01)
G06K 15/00 (2006.01)
G03G 15/00 (2006.01)
G06F 3/03 (2006.01)

(52) U.S. Cl.
CPC ............ *G06K 15/005* (2013.01); *G03G 15/502* (2013.01); *G06F 3/0321* (2013.01)
USPC ........ 358/1.13; 358/1.15; 358/3.28; 345/157; 345/156; 382/186

(58) Field of Classification Search
USPC ......... 358/1.13, 3.28, 314, 317; 345/157, 156
See application file for complete search history.

(56) References Cited

U.S. PATENT DOCUMENTS

| 5,263,129 | A | 11/1993 | Ikegaya et al. | |
|---|---|---|---|---|
| 2006/0159345 | A1* | 7/2006 | Clary et al. | 382/186 |
| 2006/0221383 | A1* | 10/2006 | Katsurabayashi | 358/1.15 |
| 2008/0239333 | A1 | 10/2008 | Ogashiwa | |
| 2008/0273010 | A1* | 11/2008 | Newman et al. | 345/157 |

FOREIGN PATENT DOCUMENTS

| JP | 62-009425 | 1/1987 |
|---|---|---|
| JP | 3-218160 | 9/1991 |

(Continued)

OTHER PUBLICATIONS

Notice of Reasons for Refusal dated Sep. 10, 2013 for Japanese Patent Application No. 2010-0141234 (3 pages).

*Primary Examiner* — Marivelisse Santiago Cordero
*Assistant Examiner* — Temitayo Folayan
(74) *Attorney, Agent, or Firm* — Buchanan Ingersoll & Rooney PC

(57) ABSTRACT

Disclosed is an image forming apparatus, which makes it possible to improve the maneuverability and usability of the apparatus concerned. The apparatus includes: a display section to display a screen thereon; a controlling section to form a synthesized image in which position detecting symbols are synthesized with an image onto which the screen displayed on the display section is to be arranged; a storage section to store a table in which the keys and corresponding positions of the keys, arranged on the paper sheet, are correlated with each other, respectively; and a printing section to print the synthesized image onto the paper sheet. When acquiring positional information, the controlling section refers to the table so as to specify a specific key correlated with the positional information, and establishes a status of the image forming apparatus, being same as that established by designating the specific key from the screen.

21 Claims, 14 Drawing Sheets

(56) References Cited

FOREIGN PATENT DOCUMENTS

| | | |
|---|---|---|
| JP | 2003-529852 | 10/2003 |
| JP | 2004-280519 | 10/2004 |
| JP | 2008-242723 | 10/2008 |
| WO | WO 01/75779 | 10/2001 |

* cited by examiner

FIG. 5a

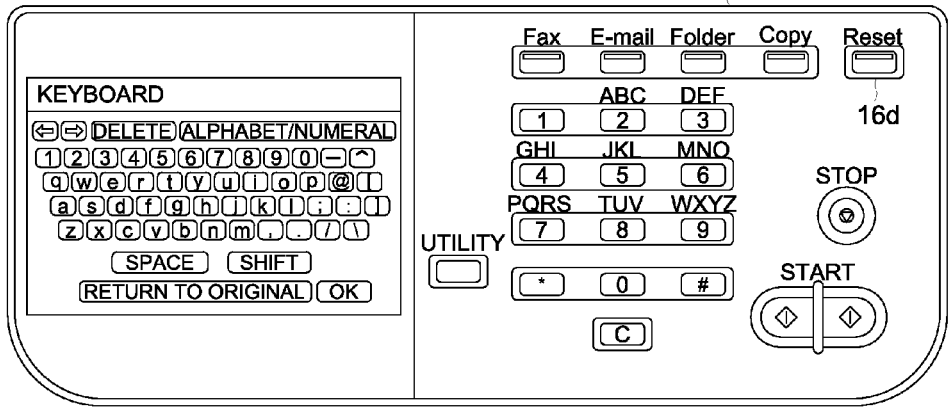

⇩ DEPRESSING START KEY

FIG. 5b

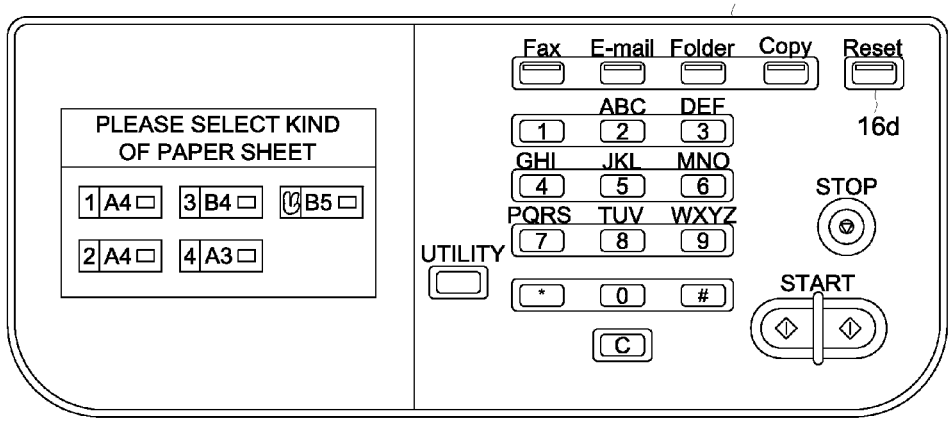

⇩ DEPRESSING START KEY AFTER SHEET SIZE OF
OPERATING USE PRINT PRODUCT IS SELECTED

PRINTING IMAGE CREATED BY SYNTHESIZING POSITION DETECTING SYMBOLS AND OPERATING AREA WITH LCD DISPLAY IMAGE SO AS TO MAKE SYNTHESIZED IMAGE TO BE INCLUDED WITHIN SELECTED PAPER SHEET. STORING SYNTHESIZED IMAGE INTO NONVOLATILE STORAGE WHILE CORRELATING FUNCTIONS TO BE PRINTED AND POSITIONAL INFORMATION OF THEM WITH EACH OTHER.

FIG. 5c

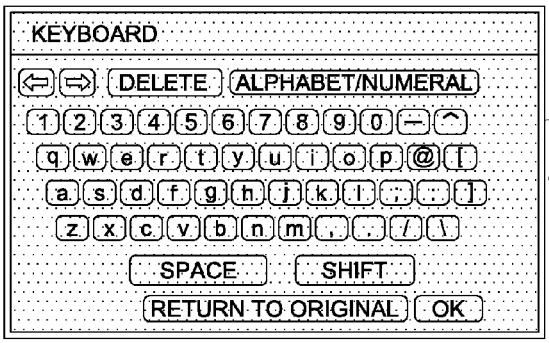

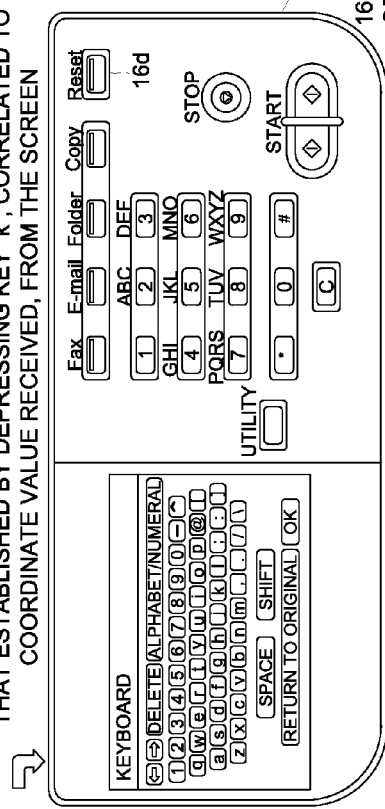
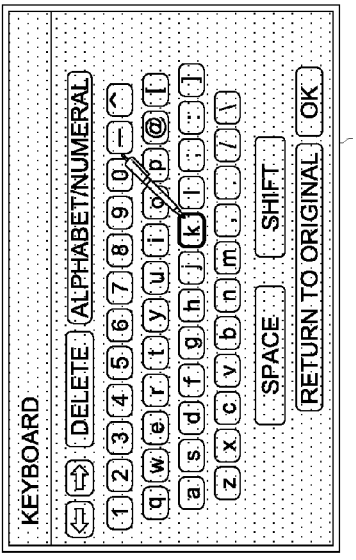

FIG. 6a
TOUCHING TO AREA OF CHARACTER "k" WITH ELECTRONIC PEN

MFP RECEIVES COORDINATE VALUE INPUTTED BY ELECTRONIC PEN. MFP ESTABLISHES SETTING INSTRUCTION STATUS, BEING SAME AS THAT ESTABLISHED BY DEPRESSING KEY "k", CORRELATED TO COORDINATE VALUE RECEIVED, FROM THE SCREEN

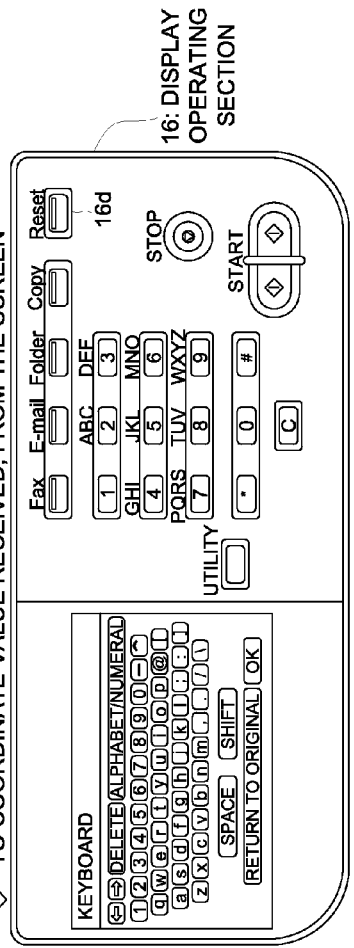
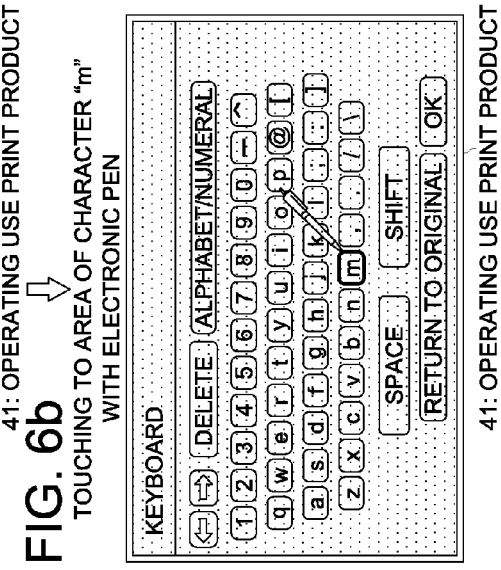

FIG. 6b
TOUCHING TO AREA OF CHARACTER "m" WITH ELECTRONIC PEN

MFP RECEIVES COORDINATE VALUE INPUTTED BY ELECTRONIC PEN. MFP ESTABLISHES SETTING INSTRUCTION STATUS, BEING SAME AS THAT ESTABLISHED BY DEPRESSING KEY "m", CORRELATED TO COORDINATE VALUE RECEIVED, FROM THE SCREEN

FIG. 8

| SCREEN No. | SCREEN | KEY | X Min | X Max | Y Min | Y Max | SCREEN OF SAME CATEGORY |
|---|---|---|---|---|---|---|---|
| 1 | : | : | : | : | : | : | : |
| : | : | : | : | : | : | : | : |
| 10 | CHARACTER INPUT: LOWERCASE CHARACTER | ← | $X_{a1-1}$ | $X_{a1-2}$ | $Y_{a1-1}$ | $Y_{a1-2}$ | 11 |
| 10 | | → | $X_{b1-1}$ | $X_{b1-2}$ | $Y_{b1-1}$ | $Y_{b1-2}$ | 11 |
| 10 | | DELETE | $X_{c1-1}$ | $X_{c1-2}$ | $Y_{c1-1}$ | $Y_{c1-1}$ | 11 |
| 10 | | 1 | $X_{d1-1}$ | | | | |
| 10 | | | | | | | |
| 10 | | k | $X_{h4-1}$ | $X_{h4-2}$ | $Y_{h4-1}$ | $Y_{h4-2}$ | 11 |
| 10 | | l | $X_{i4-1}$ | $X_{i4-2}$ | $Y_{i4-1}$ | $Y_{i4-2}$ | 11 |
| 10 | | : | $X_{j4-1}$ | | | | |
| 10 | | OK | $X_{b7-1}$ | $X_{b7-2}$ | $Y_{b7-1}$ | $Y_{b4-2}$ | 11 |
| 11 | CHARACTER INPUT: UPPERCASE CHARACTER | ← | $X_{A1-1}$ | $X_{A1-2}$ | $Y_{A1-1}$ | $Y_{A1-2}$ | 10 |
| 11 | | → | $X_{B1-1}$ | | | | |
| 11 | | | | | | | |
| 11 | | A | $X_{A4-1}$ | $X_{A4-2}$ | $Y_{A4-1}$ | $Y_{A4-2}$ | 10 |
| 11 | | S | $X_{B4-1}$ | $X_{B4-2}$ | $Y_{B4-1}$ | $Y_{B4-2}$ | 10 |
| 11 | | D | $X_{C4-1}$ | | | | |
| 15 | COLOR MODE | FULL COLOR | $X_{W1-1}$ | $X_{W1-2}$ | $Y_{W1-1}$ | $Y_{W1-2}$ | 0 |
| 15 | | MONO-CHROME | $X_{X1-1}$ | $X_{X1-2}$ | $Y_{X1-1}$ | $Y_{X1-2}$ | 0 |
| : | : | : | : | : | : | : | : |

FIG. 10a
DEPRESSING SHIFT KEY
FIG. 10b
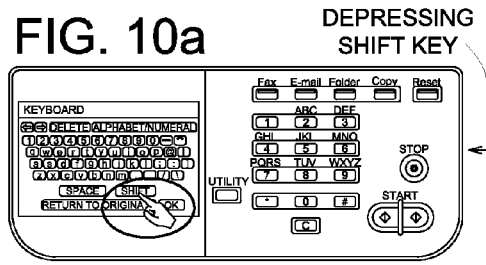
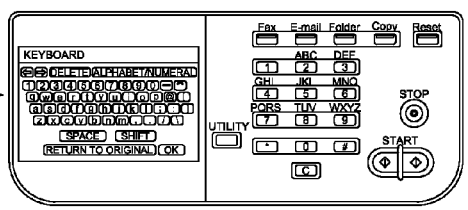
DEPRESSING START KEY
DEPRESSING START KEY
FIG. 10c
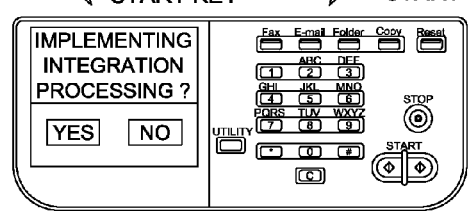
FIG. 10d
SELECTING YES
SELECTING NO
FIG. 10f
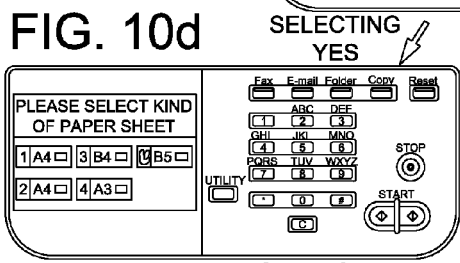
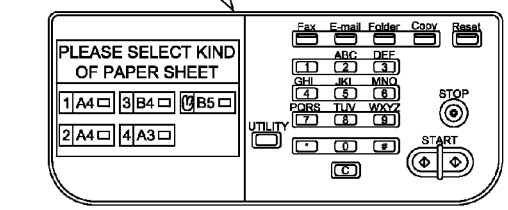
A4 SELECTION — PRINTING INTEGRATED IMAGE ONTO A4-SIZE PAPER SHEET BY INTEGRATING TWO SCREEN IMAGES
A4 SELECTION — CONTINUOUSLY PRINTING TWO IMAGES ONTO TWO A4-SIZE PAPER SHEETS, SEPARATELY, SO THAT EACH OF TWO IMAGES IS FITTED INTO EACH OF TWO A4-SIZE PAPER SHEETS
FIG. 10e
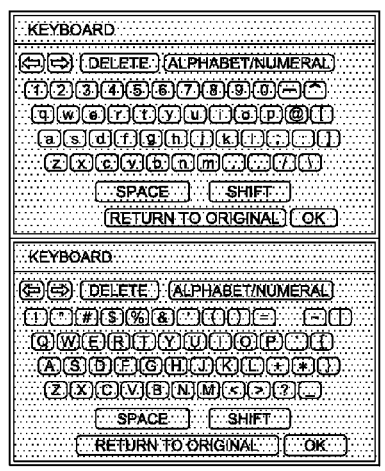
FIG. 10g
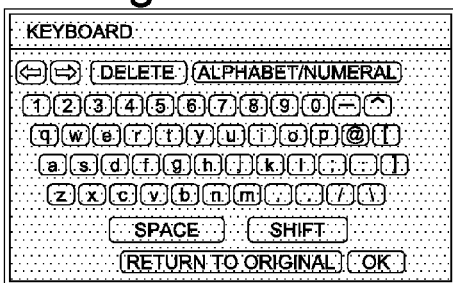
+
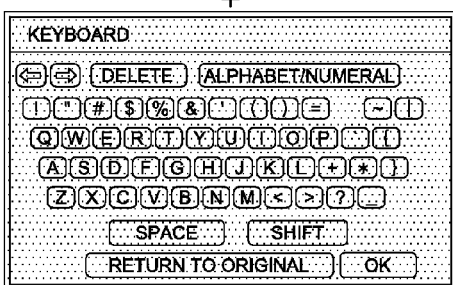

FIG. 11a

TOUCHING "A" WITH ELECTRONIC PEN TO INPUT "A"

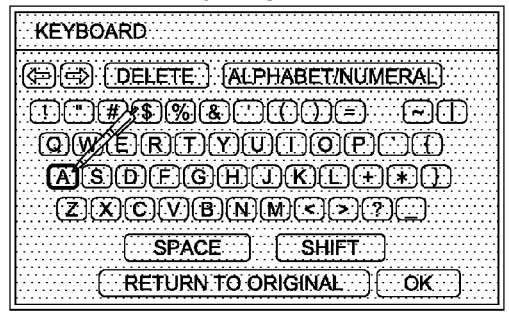

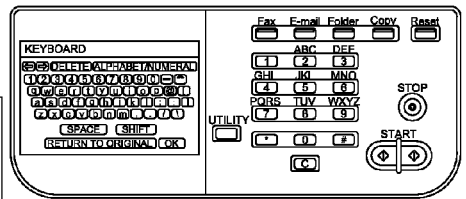

MFP RECEIVES COORDINATE VALUE INPUTTED BY ELECTRONIC PEN

MFP ESTABLISHES SETTING INSTRUCTION STATUS, BEING SAME AS THAT ESTABLISHED BY DEPRESSING KEY "A", CORRELATED TO COORDINATE VALUE RECEIVED, FROM THE SCREEN

FIG. 11b

TOUCHING "b" WITH ELECTRONIC PEN TO INPUT "b"

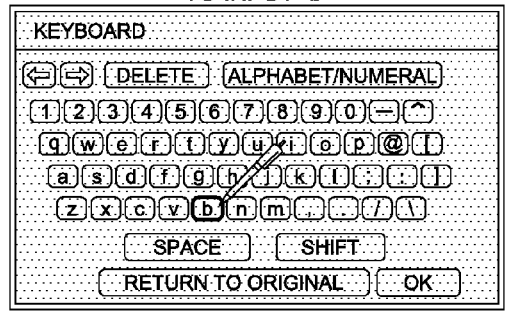

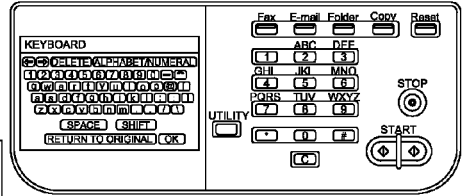

MFP RECEIVES COORDINATE VALUE INPUTTED BY ELECTRONIC PEN

MFP ESTABLISHES SETTING INSTRUCTION STATUS, BEING SAME AS THAT ESTABLISHED BY DEPRESSING KEY "b", CORRELATED TO COORDINATE VALUE RECEIVED, FROM THE SCREEN

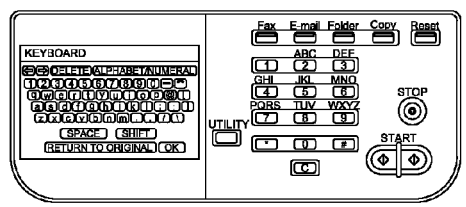

IMAGE FORMING APPARATUS AND OPERATION CONTROLLING METHOD OF THE SAME

This application is based on Japanese Patent Application NO. 2010-141234 filed on Jun. 22, 2010, with Japan Patent Office, the entire content of which is hereby incorporated by reference.

BACKGROUND OF THE INVENTION

The present invention relates to an image forming apparatus and an operation controlling method of the image forming apparatus concerned.

In recent years, there have been proliferated in the market various kinds of MFPs (Multi Function Peripheral), which are provided with a printer function, a scanner function, etc. Associated with the increase of the functions to be provided with the MFP, the operations for setting the various kinds of functions have become complicated. To solve such the problem as abovementioned, it can be considered to make the display screen as wider as possible, so as to make it possible to display lots of information onto the display screen at a time. However, due to the limitations in regard to an installation space and a cost of required parts, it is not easy to widen the display screen, but, in reality, lots of information is displayed within a limited small-sized display screen. For instance, with respect to a keyboard screen from which characters are to be inputted, in order to arrange many character inputting buttons within a limited small area, each size of the character inputting buttons should be reduced, and/or, the character inputting buttons should be arranged as closely as possible. As a result, inputting operations to be conducted by the user may become difficult, and there has been fear that the erroneous inputting operations are liable to occur.

In view of the abovementioned background, a new method for improving the maneuverability of the MFP has been required. For instance, to cope with such the demand, Tokkai 2004-280519 (Japanese Patent Application Laid-Open Publication) sets forth the technology that includes: dividing the positional information recording medium into arbitral areas; respectively allotting specific functions to the above-divided arbitral areas on the application program or the system concerned; acquiring data and positional information written into each of the above-divided arbitral areas by using the positional information acquiring apparatus; implementing the specific function, allotted to the data within the concerned area, on the application program or the system concerned, based on the positional information acquired.

According to the technology set forth in Tokkai 2004-280519 above cited, since the area of the print product, into which the position detecting pattern is embedded in advance, is divided into the arbitral areas, and then, the specific functions are respectively allotted to the arbitral areas, so as to implement the specific function, allotted to the data within the concerned area, based on the positional information acquired, it is possible to implement the specific function of the concerned apparatus by operating the electronic pen onto the print product. However, according to the conventional technology abovementioned, there has arisen another problem that the maneuverability of the concerned apparatus becomes worse, due to the difference between the layout of the screen displayed on the apparatus and that of the print product.

SUMMARY OF THE INVENTION

To overcome the abovementioned drawbacks in conventional image forming apparatus, it is one of objects of the present invention to provide an image forming apparatus and an operation controlling method, which makes it possible to improve the maneuverability and usability of the image forming apparatus concerned.

Accordingly, at least one of the objects of the present invention can be attained by any one of the image forming apparatuses described as follows.

(1) According to an image forming apparatus reflecting an aspect of the present invention, the image forming apparatus, comprises: a display section to display a screen thereon; a controlling section to form an image onto which the screen displayed on the display section is to be arranged, and then, to form a synthesized image in which position detecting symbols are synthesized with the image concerned, wherein the position detecting symbols are used for specifying a position of each of keys, which are included in the image formed on a paper sheet and which are originally included in the screen; a storage section to store a table in which the keys and corresponding positions of the keys, arranged on the paper sheet, are correlated with each other, respectively; and a printing section to print the synthesized image onto the paper sheet; wherein, when acquiring positional information representing a specific position on the paper sheet, specified by the position detecting symbols, the controlling section refers to the table so as to specify a specific key correlated with the positional information, and establishes a status of the image forming apparatus, being same as that established by designating the specific key from the screen.

(2) According to another aspect of the present invention, in the image forming apparatus recited in item 1, when determining that another screen, which belongs to a category being same as that of said screen, exists, the controlling section forms an integrated image onto which the screen and the other screen are to be integrally arranged, and then, forms another synthesized image in which the position detecting symbols are synthesized with the integrated image concerned.

(3) According to still another aspect of the present invention, in the image forming apparatus recited in item 1, when determining that another screen, which belongs to a category being same as that of said screen, exists, the controlling section forms the image onto which the screen is to be arranged, and another image onto which the other screen is to be arranged, separately, and then, forms the synthesized image in which the position detecting symbols are synthesized with the image concerned, and another synthesized image in which the position detecting symbols are synthesized with the other image concerned, separately; and wherein the printing section prints the synthesized image and the other synthesized image onto the paper sheet and another paper sheet, separately.

(4) According to still another aspect of the present invention, in the image forming apparatus recited in any one of items 1-3, when a specific screen corresponding to the specific key is currently displayed on the display section, the controlling section establishes the status of the image forming apparatus.

(5) According to yet another aspect of the present invention, in the image forming apparatus recited in any one of items 1-4, the position detecting symbols constitute a pattern, which is recognizable for an electronic pen.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5a, FIG. 5b, and FIG. 5c show explanatory schematic diagrams indicating a method for creating an operating use print product, embodied in the present invention;

FIG. 6a and FIG. 6b show explanatory schematic diagrams indicating a method for operating an image forming apparatus by using an operating use print product, embodied in the present invention;

FIG. 8 shows a schematic diagram indicating an exemplified table in which numbers of screen, keys and positional information of the keys are correlated with each other, respectively;

FIG. 10a, FIG. 10b, FIG. 10c, FIG. 10d, FIG. 10e, FIG. 10f, and FIG. 10g show explanatory schematic diagrams indicating a method for creating an operating use print product on which two screen images are printed, embodied in the present invention;

FIG. 11a and FIG. 11b show explanatory schematic diagrams indicating a method for operating an image forming apparatus by using an operating use print product on which two screen images are printed, embodied in the present invention;

DETAILED DESCRIPTION OF THE PREFERRED EMBODIMENT

As described in the "Background of the invention", associated with the increase of the functions to be provided with the MFP, the operations for setting the various kinds of functions have become complicated. To solve this problem, the method for employing a paper sheet, the surface of which is divided into a plurality of areas corresponding to each of the functions provided, has been proposed so far. However, according to this method, there has arisen another problem that the maneuverability of the concerned apparatus becomes worse, due to the difference between the layout of the screen displayed on the apparatus and that of the print product.

In view of the abovementioned problem, an image forming apparatus, embodied in the present invention, forms an image for arranging the screen image, currently displayed on the apparatus, onto a paper sheet, and further forms a synthesized image by synthesizing positional information for specifying each of keys included in the concerned screen with the image, so as to print the synthesized image onto the paper sheet. Then, the image forming apparatus acquires positional information of a key, selected by the user from the keys printed on the concerned paper sheet, so as to specify the key correlated with the positional information, and establishes the own apparatus status being same as that established by designating the concerned key from the display screen. As described in the above, by printing the image, having the structure same as that to be displayed on the screen, onto the paper sheet, it becomes possible to operate the image forming apparatus on the paper sheet in the same manner as operating on the screen, resulting in a considerable improvement of the maneuverability of the apparatus concerned.

Embodiment

Figure 1:
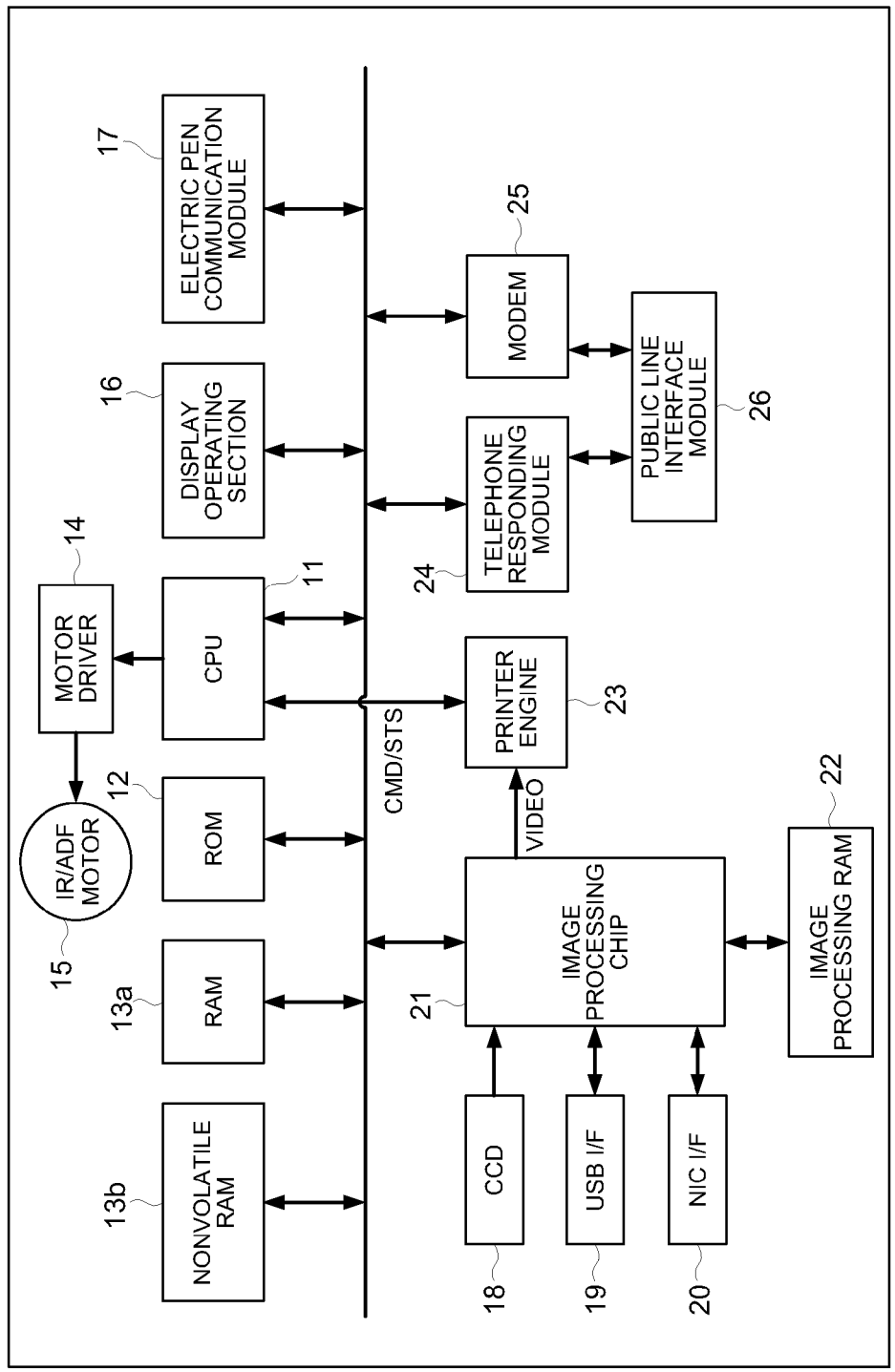
FIG. 1 shows a block diagram indicating a configuration of a controller provided in an image forming apparatus, embodied in the present invention.
Figure 2:
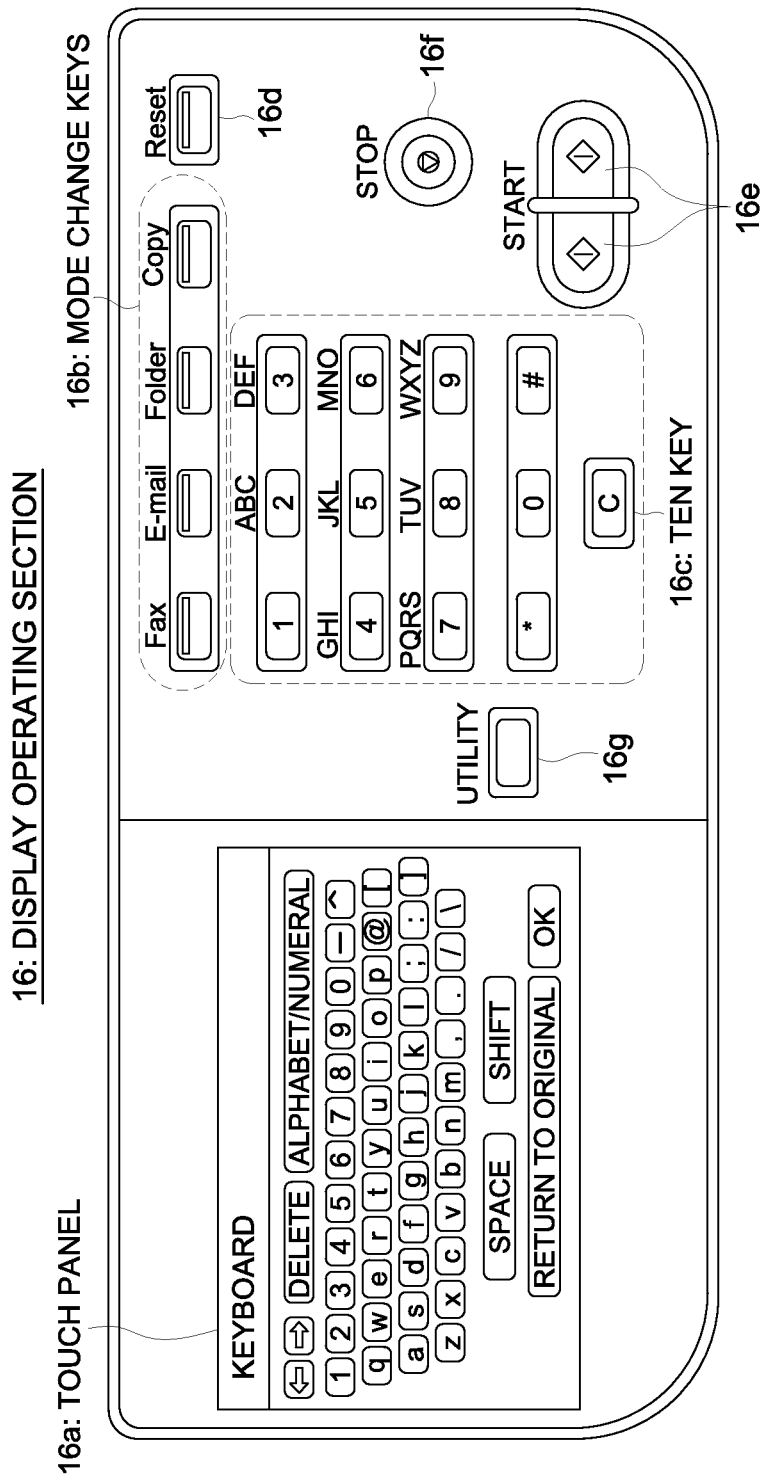
FIG. 2 shows a schematic diagram indicating an outer appearance configuration of a display operating section provided in an image forming apparatus, embodied in the present invention.
Figure 3:
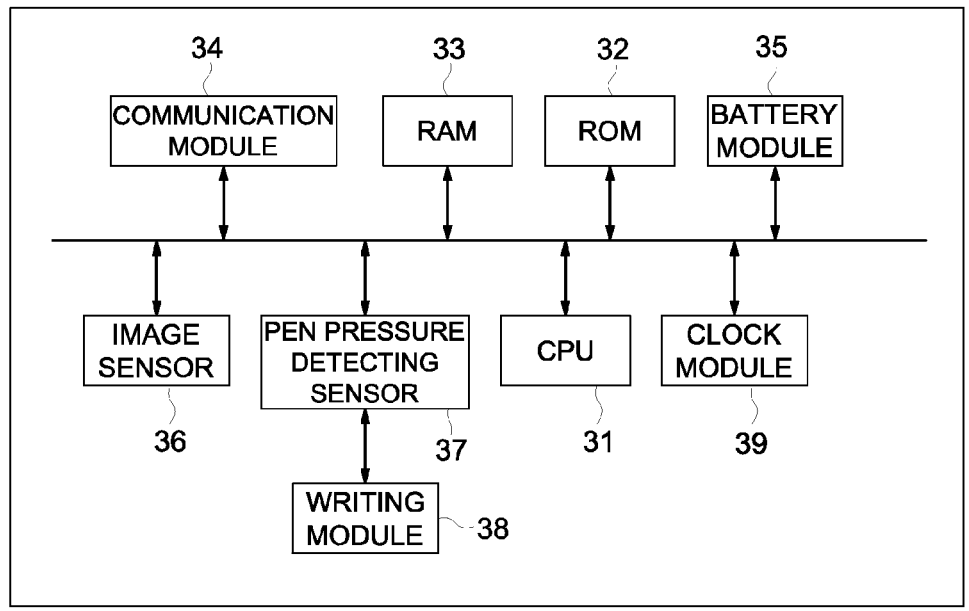
FIG. 3 shows a block diagram indicating a configuration of an electronic pen to be used with an image forming apparatus, embodied in the present invention.
Figure 4:
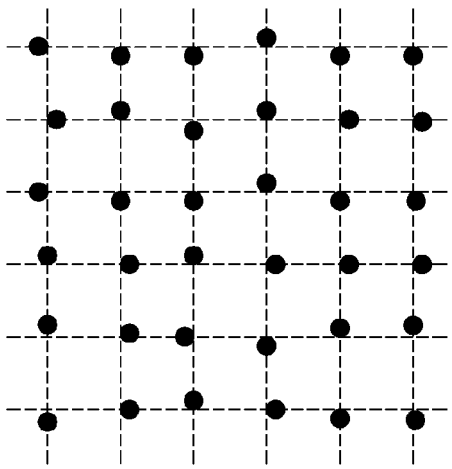
FIG. 4 shows a schematic diagram indicating an example of an Anoto (Registered Trade Mark) pattern.
Figure 7A:
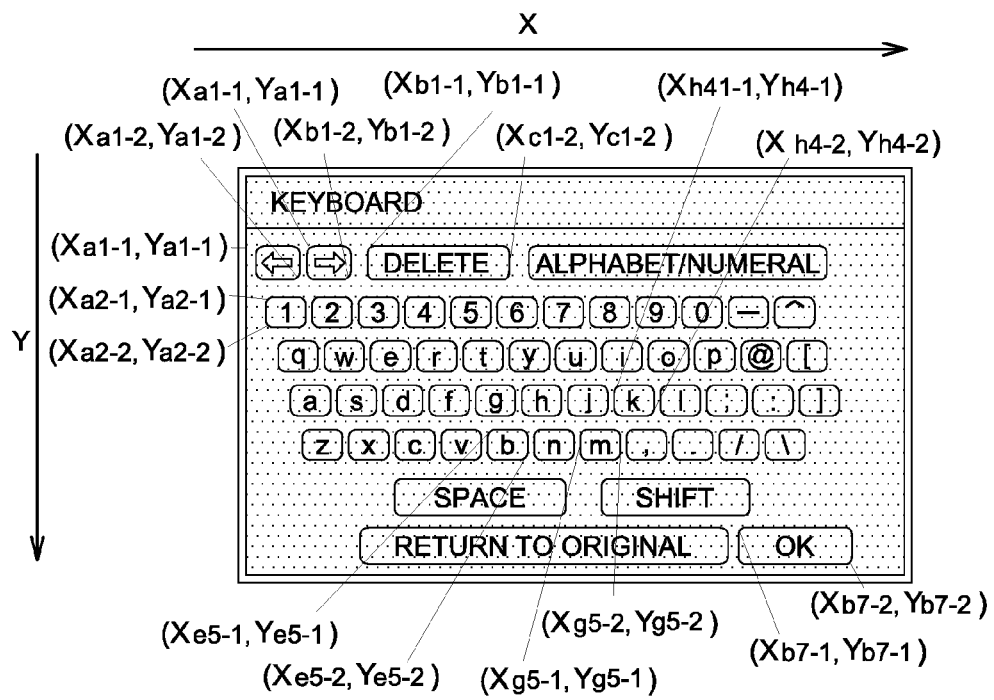
FIG. 7a and FIG. 7b show schematic diagrams indicating positional information within each of areas, corresponding to each of keys printed in an operation use print product, embodied in the present invention.
Figure 7B:
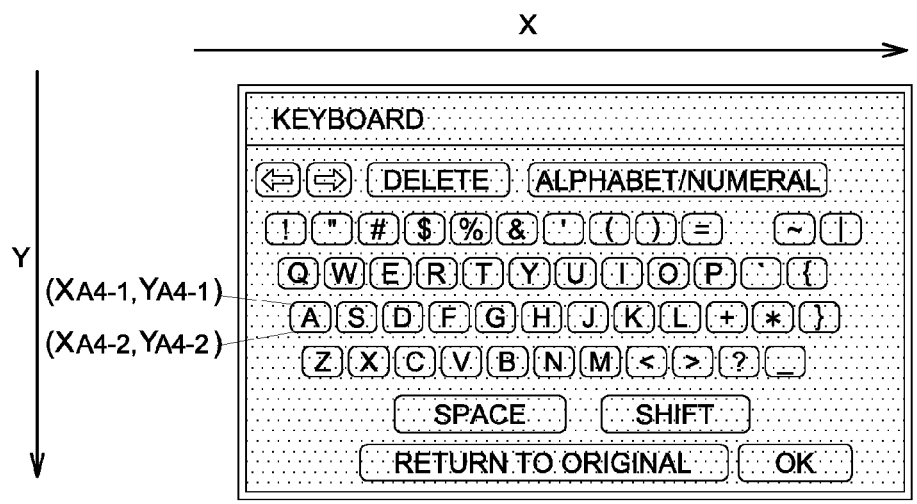

In order to further describe the preferred embodiment of the present invention in detail, referring to FIG. 1 through FIG. 13b, an image forming apparatus and an operation controlling method of the image forming apparatus, embodied in the present invention, will be detailed in the following. FIG. 1 shows a block diagram indicating a configuration of a controller provided in an image forming apparatus, embodied in the present invention, FIG. 2 shows a schematic diagram indicating an outer appearance configuration of a display operating section. Further, FIG. 3 shows a block diagram indicating a configuration of an electronic pen, while FIG. 4 shows a schematic diagram indicating an example of an Anoto (Registered Trade Mark) pattern. Still further, FIGS. 5a-5c, FIGS. 6a-6b, FIGS. 10a-10g and FIGS. 11a-11b show schematic diagrams indicating the operation controlling method embodied in the present invention, while FIGS. 9a-9b, 12 and 13a-13b show flowcharts indicating operations to be conducted in the image forming apparatus embodied in the present invention. Still further, FIGS. 7a-7b show schematic diagrams indicating positional information within each of areas, corresponding to each of keys in an operation use print product, while FIG. 8 shows a schematic diagram indicating an exemplified table in which numbers of screen, keys and positional information of the keys are correlated with each other, respectively. In this connection, hereinafter in the present specification, the term of "key" is defined as a button or the like, by which an instruction can be inputted into the image forming apparatus, and which is not limited to such a button that makes it possible to specify a function independently (for instance, a "copy" button provided on a function setting screen, an "OK" button provided on a character inputting screen, etc.), but also includes such a button that cannot specify a function independently (for instance, an "a" button provided on a character inputting screen, etc.).

The system, embodied in the present invention, is constituted by an image forming apparatus, such as an MFP (Multi Function Peripheral), etc., an electronic pen that specifies a position residing on a paper sheet and printed by the image forming apparatus to transmit positional information to the image forming apparatus concerned. The positional information represents an item to be specified (for instance, "full color mode" included in the color function, etc.). Referring to the drawings, the system, embodied in the present invention, will be detailed in the following.

<Image Forming Apparatus>

FIG. 1 shows a block diagram indicating a configuration of a controller provided in an image forming apparatus 10, embodied in the present invention. The controller is constituted by a CPU (Central Processing Unit) 11, a ROM (Read Only Memory) 12, a RAM (Random Access Memory) 13a, a nonvolatile RAM (Random Access Memory) 13b, a motor driver 14, an IR/ADF (Image Reader/Automatic Document Feeder) motor 15, a display operating section 16, an electronic pen communication module 17, a CCD (Charge Coupled Device) 18, a USB (Universal Serial Bus) interface 19, a NIC (Network Interface Card) 20, an image processing chip 21, an image processing RAM (Random Access Memory) 22, a printer engine 23, a telephone responding module 24, a modem 25, a public line interface module 26, etc.

A controlling section is constituted by the CPU 11, the ROM 12, the RAM 13a and the nonvolatile RAM 13b. The CPU 11 copies a controlling program stored in the ROM 12 onto the RAM 13a, so as to conduct overall controlling operations with respect to each of various kinds of functions, such as a scanner function, a facsimile function, a print function, a copy function, etc., according to the controlling program developed on the RAM 13a. Specifically in the present embodiment, the CPU 11 specifies a key corresponding to positional information, which represents a coordinate position residing on a special paper sheet (operating use print product, detailed later) and is transmitted from an electronic pen 30, so as to implement a processing operation corresponding to the key above-specified. Other than the controlling programs abovementioned, the ROM 12 also stores data of a pattern (kind of symbols for position detecting purpose, for instance, an Anoto (Registered Trade Mark) pattern, etc.) to be used by the electronic pen 30 for detecting a designated position on the special paper sheet. The RAM 13a is used as a storage section for temporarily storing screen data representing images to be displayed on the display operating section 16, data of various kinds of calculated values, etc., other than the controlling programs abovementioned. Further, when it is necessary to store the data even after the power source of the image forming apparatus 10 has been turned OFF, the concerned data is stored into the nonvolatile RAM 13b.

The IR/ADF motor 15 serves as a driving motor to drive the image reader and the automatic document feeder. The motor driver 14 drives the IR/ADF motor 15 and controls the driving actions, thereof.

The display operating section 16 is constituted by a touch panel, in which transparent electrodes are arranged in a lattice pattern, and which is mounted on an LCD (Liquid Crystal Display) or an Organic EL (Electro-Luminescence) display, and hard keys. FIG. 2 shows a schematic diagram indicating a concrete example of the display operating section 16. A touch panel 16a, mode change keys 16b and a ten key 16c makes it possible to establish the settings of the function. Further, a reset key 16d makes it possible to reset the current settings so as to return to the initial default settings. Still further, a start key 16e (for instance, a right side key shown in FIG. 2) makes it possible to start one of operations, such as the coping, the printing, the transmitting, etc., and the start key 16e (for instance, a left side key shown in FIG. 2) makes it possible to start the operation for printing the operating use print product, while a stop key 16f makes it possible to halt the operating status concerned. Yet further, a utility key 16g makes it possible to conduct the system setting operation and the adjustment function of the image forming apparatus 10 proper.

The electronic pen communication module 17 communicates with a communication module 34 provided in the electronic pen 30 through a short distance wireless communication link, represented by the Bluetooth (Registered Trade Mark) communication method, or a kind of wired communication link, so as to receive the positional information on the special paper sheet (serving as the operating use print product) from the electronic pen 30, and to store the received positional information into the RAM 13a.

The CCD 18 is installed into the image reader and/or the automatic document feeder so as to detect intensities of light reflected from the document onto which the light beam is scanned and to convert the intensities of light to analogue signals, and applies the analogue to digital conversion processing to the above-converted analogue signals so as to create digital image data representing the scanned image. The USB interface 19 serves as an interface to couple the image forming apparatus 10 to an external USB (Universal Serial Bus) connectable apparatus. The NIC 20 serves as an extension card for coupling the image forming apparatus 10 to a computer apparatus owned by the user, or the like, through a LAN (Local Area Network), to input the print data transmitted from the computer apparatus owned by the user, or the like, and to transmit the image data, created on the basis of the image signals acquired by scanning an image, to the computer apparatus owned by the user, or the like.

The image processing chip 21 implements various kinds of image processing, such as a magnification factor change processing, an image rotation processing, a density adjustment processing, an edge enhancement processing, a smooth processing, a binarization processing, etc. Specifically in the present embodiment, the image processing chip 21 conducts a processing for synthesizing a pattern image, which is to be used for detecting a position on a paper sheet designated by the electronic pen 30, with the image into which images selected by the user are arranged on the paper sheet. The image processing RAM 22 temporarily stores image data, various kinds of calculated values, etc., which are to be outputted in the process of the image processing conducted by the image processing chip 21, therein. The printer engine 23 forms an image onto the paper sheet concerned, based on the image data stored in the image processing RAM 22.

The telephone responding module 24 implements a responding operation to be conducted at the time of receiving information. The modem 25 modulates and converts digital signals so as to output analogue signals in conformity with the public telephone line, and conversely, converts and demodulates received analogue signals to digital signals. The public line interface module 26 serves as an interface for connecting the image forming apparatus 10 to the public line network.

Now, the general purpose operations to be conducted in the controller having the abovementioned configuration will be briefly described in the following.

Receiving the instruction from the display operating section 16, the CPU 11 makes the motor driver 14 control the IR/ADF motor 15, and at the same time, requests the image processing chip 21 to implement the image processing.

Receiving the request for implementing the image processing, the image processing chip 21 receives scanned data from the CCD 18, and applies the conversion image processing to the scanned data so as to convert the scanned data to image data representing an image designated by the display operating section 16. On that occasion, various kinds of calculated values, etc. are temporarily stored into the image processing RAM 22.

After the above-processed image data outputted from the image processing chip 21 is temporarily stored into the image processing RAM 22 and in the case that the instruction from the display operating section 16 indicates the scanning operation, the concerned image data is transferred to the USB interface 19 or the NIC 20 through the image processing chip 21. In the case that the instruction from the display operating section 16 indicates the facsimile operation, the concerned image data is transferred to the public line interface module 26 through the modem 25. In the case that the instruction from the display operating section 16 indicates the copy operation, the concerned image data is transferred to the printer engine 23 through the image processing chip 21.

When print data is received from an external apparatus, the USB interface 19 or the NIC 20 accepts the print data, and then, the image processing chip 21 applies the expansion processing to the print data, and the expanded print data is temporarily stored into the RAM 13a, and then, transferred to the printer engine 23 from the RAM 13a.

In this connection, although the configuration shown in FIG. 1 is so constituted that the image processing chip 21 implements the operation for synthesizing the pattern image, which is to be used for detecting a position on the paper sheet designated by the electronic pen 30, with the image into which images selected by the user are arranged on the paper sheet, it is also applicable that the concerned configuration is so constituted that the controlling section implements the consecutive operations for synthesizing the pattern image with the image arranged by the user and making the printer engine 23 print the synthesized image onto the paper sheet.

<Electronic Pen>

FIG. 3 shows a block diagram indicating a configuration of the electronic pen 30. As shown in FIG. 3, the electronic pen 30 is constituted by a CPU (Central Processing Unit) 31, a ROM (Read Only Memory) 32, a RAM (Random Access Memory) 33, the communication module 34, a battery module 35, an image sensor 36, a pen pressure detecting sensor 37, a writing module 38, a clock module 39, etc.

The CPU 31 serves as a data processing device that executes various kinds of programs so as to perform various kinds of arithmetic calculating operations. The ROM 32 serves as an information storage section into which the various kinds of programs are stored, while, the RAM 33 serves as another information storage section into which the various kinds of data are stored. The communication module 34 communicates with the electric pen communication module 17 provided in the image forming apparatus 10 through the short distance wireless communication link, represented by the Bluetooth (Registered Trade Mark), or the wired communication line. The battery module 35 includes a primary battery or a secondary battery, serving as an electric power source of the electronic pen 30. The image sensor 36 includes a small-sized CCD (Charge Coupled Device) video camera or a small-sized CMOS (Complementary Metal-Oxide Semiconductor) video camera, for reading the printed pattern. The pen pressure detecting sensor 37 includes a piezoelectric element or the like, to detect a pen pressure of the electronic pen 30. The writing module 38 serves as such a device that specifies a position of the electronic pen 30 on the paper sheet, based on pattern information read by the image sensor 36, so as to output positional information via the communication module 34. The clock module 39 serves as such a device that retains clock information.

In this connection, the scopes of the configuration, the shape, the communication method, etc., which are to be provided in the electronic pen 30, are not limited to those of a specific embodiment, as far as the electronic pen 30 is provided with the function for specifying a position on the operating use print product and the function for transmitting the positional information (coordinate information) to the image forming apparatus 10. For instance, it is applicable that the electronic pen 30 is configured to distinguish the Anoto (Registered Trade Mark) pattern so as to specify the position, or configured to distinguish the structure, the density, the consistency, etc., of the pattern so as to specify the position concerned. Further, it is also applicable that the electronic pen 30 is configured to read a pattern of a barcode or the like so as to specify the position, or configured to specify the position in conjunction with a device dispose in the vicinity of the operating use print product (for instance, based on an angle and/or a distance with respect to the device concerned). Hereinafter, an embodiment that employs the Anoto (Registered Trade Mark) pattern will be detailed in the following as the present embodiment.

FIG. 4 shows a schematic diagram indicating an example of the Anoto (Registered Trade Mark) pattern. According to the Anoto (Registered Trade Mark) pattern shown in FIG. 4, dots are arranged on a lattice pattern, and each of the dots is slightly shifted form each of intersections on the lattice pattern, which is formed by orthogonally intersecting lines aligned at intervals of 0.3 mm, in any one of upper, lower, left and right directions, so that the image sensor 36 reads the dots in a unit of the 36 dots matrix of "vertical 6 dots"דhorizontal 6 dots" at a time. Since every point in the Anoto (Registered Trade Mark) pattern represents a unique value, by determining the arrangement between the operating use print product and the Anoto (Registered Trade Mark) pattern to be synthesized with the operating use print product (namely, by determining the position in the pattern space, from which the Anoto (Registered Trade Mark) pattern, to be synthesized with the operating use print product, is cut out), it becomes possible for the electronic pen 30 to recognize an arbitral point on the operating use print product. Although the present embodiment is so constituted that data of the Anoto (Registered Trade Mark) pattern is stored into the ROM 12 in advance, it is also applicable that the system is so constituted that the concerned data is stored in a server coupled to a network, so as to make it possible to retrieve the concerned data from the server through the network, every time when recognizing the point.

Next, referring to FIG. 5a through FIG. 8, substantial operations, for outputting the operating use print product onto which the synthesized image formed by synthesizing the pattern with the screen image to be displayed on the touch panel 16a of the display operating section 16 is printed, and then, using the operating use print product above-outputted for operating the image forming apparatus 10, will be detailed in the following.

Initially, as shown in FIG. 5a, the user conducts a predetermined operation to make the image forming apparatus 10 display a desired screen to be printed onto the operating use print product on the touch panel 16a. Successively, as shown in FIG. 5b, the user depresses a start key 16e of the display operating section 16, etc., so as to make the controlling section display a screen for selecting the size of the operating use print product on the touch panel 16a. When the user selects a desired paper sheet (preferably, a paper sheet having a size larger than that of the screen currently displayed), and depresses the start key 16e, etc., the image processing chip 21 provided in the controller creates a screen image in which the selected screen is arranged on the paper sheet, so as to synthesize the pattern with the screen image created. Successively, the controlling section makes the printer engine 23 print the synthesized image onto the paper sheet concerned, so as to output a operating use print product 41 shown in FIG. 5c. In this connection, although the character inputting screen of the keyboard is displayed on the operating use print product 41 shown in FIG. 5c, the scope of the screen to be printed is not specifically limited to the abovementioned, but any kind of screen is applicable, as far as the screen can be displayed on the touch panel 16a.

Further, the controlling section stores the selected screen, the keys on the selected screen and the positional information of the keys on the operating use print product 41 into the nonvolatile RAM 13b, while correlating them with each other. FIG. 7 shows a schematic diagram indicating the positional information (coordinate values) of each of the keys on the selected screen, while FIG. 8 shows a schematic diagram indicating an exemplary table in which the screen, the keys on the screen and the positional information (coordinate values) of diagonal corner positions of the image area of each of the keys are correlated with each other.

Successively, the user employs the electronic pen 30 for selecting one of options of each function from keys printed on the operating use print product 41. For instance, as shown in FIG. 6a, when the user touches the area representing the character "k" with the electronic pen 30, the electronic pen 30 specifies the concerned coordinate (X, Y) by detecting the pattern printed onto the area corresponding to the character "k", to transmit the coordinate (X, Y) to the image forming apparatus 10. Then, receiving the coordinate (X, Y) through the electric pen communication module 17, the image forming apparatus 10 determines that the received coordinate represents the area "k" $(X_{h4-1}, Y_{h4-1})$-$(X_{h4-2}, Y_{h4-2})$, by referring to the table (table shown in FIG. 8) stored in the nonvolatile RAM 13b, and accordingly, makes the setting instruction status same as that at the time when the key "k" is actually depressed from the touch panel 16a.

Further, as shown in FIG. 6b, when the user touches the area representing the character "m", the image forming apparatus 10 receives the coordinate (X, Y) through the electric pen communication module 17 as well. Then, the image forming apparatus 10 determines that the received coordinate represents the area "k" $(X_{g5-1}, Y_{g5-1})$ $(X_{g5-2}, Y_{g5-2})$, included in the table shown in FIG. 8 and accordingly, makes the setting instruction status same as that at the time when the key "m" is actually depressed from the touch panel 16a.

In this connection, although such the configuration that, when acquiring the coordinate values from the electronic pen 30, the image forming apparatus 10 implements the operation corresponding to the key correlated with the coordinate values concerned, has been exemplified in the above descriptions, it is also applicable that the controlling section determines whether or not the screen same as that of the operating use print product 41 is displayed on the touch panel 16a, so as to implement the operation corresponding to the key only when determining that the screen same as that of the operating use print product 41 is displayed on the touch panel 16a.

Now, referring to the flowchart shown in FIG. 9, the consecutive operations for setting the function, abovementioned, will be detailed in the following. In this connection, it is assumed in the following descriptions that the user has selected the screen in advance, and the image of the screen, selected by the user, has been printed in advance onto the operating use print product 41 serving as one page of the paper sheet, and further, the table in which the keys included in the operating use print product 41 and the positional information of the image areas respectively corresponding to the keys are correlated with each other, has been stored in the image forming apparatus 10 in advance.

Figure 9A:
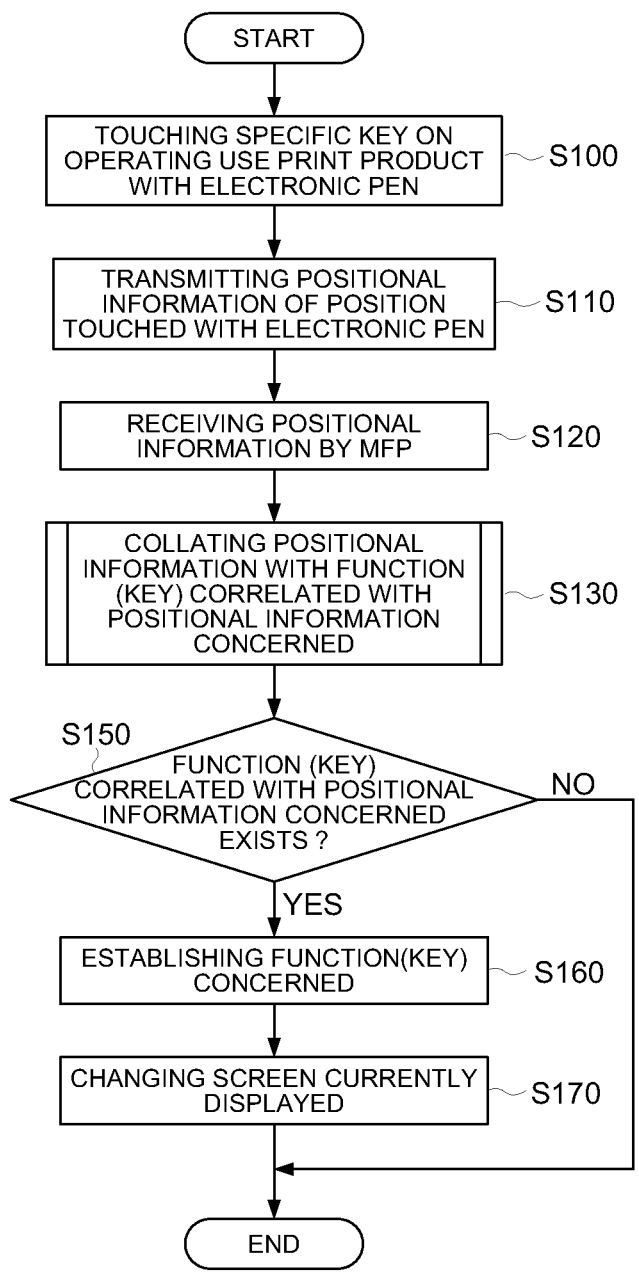
FIG. 9a and FIG. 9b show flowcharts indicating operations to be conducted in an image forming apparatus embodied in the present invention.
Figure 9B:
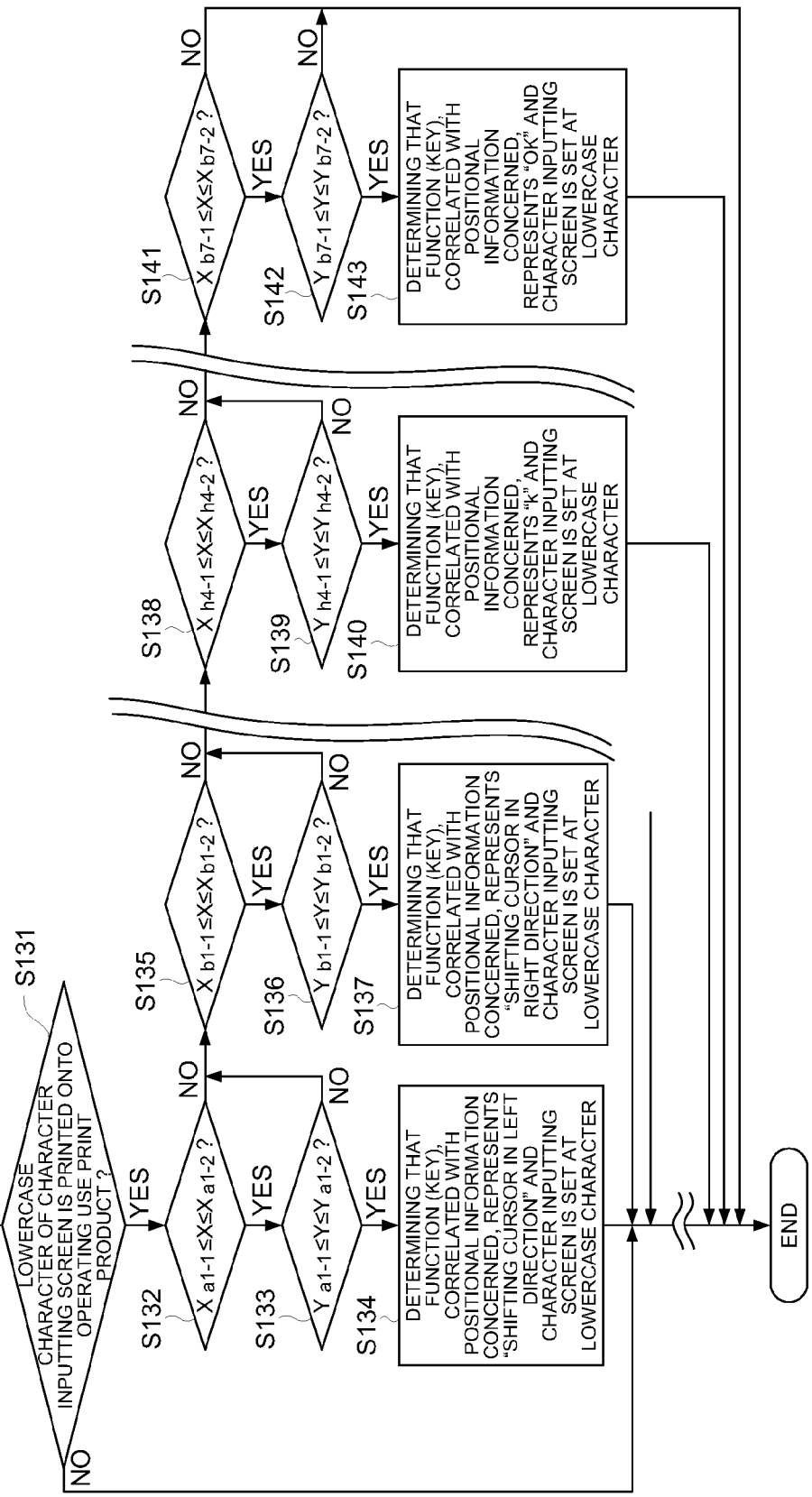

At first, as shown in FIG. 9a, the user takes out the operating use print product 41 from the image forming apparatus 10, to touch a specific key on the operating use print product 41 with the electronic pen 30 at a place where the electronic pen 30 can communicate with the electric pen communication module 17 of the image forming apparatus 10 (Step S100).

In the electronic pen 30, when the pen pressure detecting sensor 37 detects the touching action, the CPU 31 recognizes a pattern read by the image sensor 36, so as to specify a position of the concerned pattern on the operating use print product 41. Then, positional information of the specified position is transmitted to the image forming apparatus 10 through the communication module 34 (Step S110), so that the electric pen communication module 17 of the image forming apparatus 10 receives the positional information concerned (Step S120).

Successively, the controlling section of the image forming apparatus 10 collates the positional information with a function (key) correlated with the positional information concerned (Step S130). Referring to the flowchart shown in FIG. 9b, the above operational step will be detailed in the following.

Initially, the controlling section determines whether or not a lowercase character of the character inputting screen is printed onto the operating use print product 41 (Step S131). When determining that no lowercase character is printed (Step S131; No), the controlling section finalizes the processing (END), since it is impossible to correlate the function (key).

On the other hand, when determining that a lowercase character is printed (Step S131; Yes), the controlling section further determines whether or not the X coordinate value of the received positional information is in a range of $X_{a1-1}$-$X_{a1-2}$ (Step S132). When determining that the X coordinate value is in a range of $X_{a1-1}$-$X_{a1-2}$ (Step S132; Yes), the controlling section still further determines whether or not the Y coordinate value of the received positional information is in a range of $Y_{a1-1}$-$Y_{a1-2}$ (Step S133). When both Step S132 and Step S133 are determined as Yes, referring to the table shown in FIG. 8, the controlling section determines that the function (key), correlated with the positional information concerned, represents "SHIFTING CURSOR IN LEFT DIRECTION" (Step S134).

When both Step S132 and Step S133 are determined as No, the controlling section further determines whether or not the X coordinate value of the received positional information is in a range of $X_{b1-1}$-$X_{b1-2}$ (Step S135). When determining that the X coordinate value is in a range of $X_{b1-1}$-$X_{b1-2}$ (Step S135; Yes), the controlling section still further determines whether or not the Y coordinate value of the received positional information is in a range of $Y_{b2-1}$-$Y_{b2-2}$ (Step S136). When both Step S135 and Step S136 are determined as Yes, referring to the table shown in FIG. 8, the controlling section determines that the function (key), correlated with the positional information concerned, represents "SHIFTING CURSOR IN RIGHT DIRECTION" (Step S137).

Further, the controlling section repeats the same processing as abovementioned so as to determine whether or not the X coordinate value of the received positional information is in a range of $X_{b4-1}$-$X_{b4-2}$ (Step S138). When determining that the X coordinate value is in a range of $X_{b4-1}$-$X_{b4-2}$ (Step S138; Yes), the controlling section still further determines whether or not the Y coordinate value of the received positional information is in a range of $Y_{h4-1}$-$Y_{h4-2}$ (Step S139). When both Step S138 and Step S139 are determined as Yes, referring to the table shown in FIG. 8, the controlling section determines that the function (key), correlated with the positional information concerned, represents "k" (Step S140).

Still further, the controlling section repeats the same processing as abovementioned so as to determine whether or not the X coordinate value of the received positional information is in a range of $X_{b7-1}$-$X_{b7-2}$ (Step S141). When determining that the X coordinate value is in a range of $X_{b7-1}$-$X_{b7-2}$ (Step S141; Yes), the controlling section still further determines whether or not the Y coordinate value of the received positional information is in a range of $Y_{b7-1}$-$Y_{b7-2}$ (Step S142). When both Step S141 and Step S142 are determined as Yes, referring to the table shown in FIG. 8, the controlling section determines that the function (key), correlated with the positional information concerned, represents "OK" (Step S143).

Returning to the flowchart shown in FIG. 9a, based on the result of the collating operation, the controlling section determines whether or not the function (key) correlated with the positional information concerned exists (Step S150). When determining that the function (key) correlated with the positional information concerned does not exist (Step S150; No), the controlling section finalizes the processing (END), while, when determining that the function (key) correlated with the positional information concerned exists (Step S150; Yes), the controlling section establishes the own apparatus status being substantially same as that established by depressing the key of the concerned function currently displayed on the touch panel 16a of the display operating section 16 (Step S160), and makes the setting instruction status, with respect to the screen (herein, the lowercase character inputting screen) currently displayed on the touch panel 16a, same as that to be displayed at the time when the concerned function (key) is actually selected from the touch panel 16a (Step S170).

As described in the foregoing, since the embodiment of the present invention includes the operational steps of: forming an image, on which a screen selected by the user and displayed on the touch panel 16a is arranged, onto one page of the paper sheet; synthesizing a pattern, in which the electronic pen 30 can designate a specific point, with the above-formed image; printing the above-synthesized image onto the operating use print product 41; and making it possible to establish a function (key) by using the operating use print product 41 and the electronic pen 30, it becomes possible to drastically improve the maneuverability (and/or usability) of the image forming apparatus 10 at the time when the user conducts the function setting operation.

According to the embodiment exemplified in the foregoing, the operating use print product 41 is created on the basis of a single screen to be displayed on the touch panel 16a. However, sometimes, the image forming apparatus 10 is operated by using a plurality of screens. To cope with such the case, it is also possible to create the operating use print product 41 on the basis of the plurality of screens. As an example of this case, referring to FIG. 10 and FIG. 11, the consecutive operations for creating the operating use print product 41 based on a character inputting screen for lowercase characters and another character inputting screen for uppercase characters will be detailed in the following.

As shown in FIG. 10a and FIG. 10b, with respect to such the configuration that the changeover between the lowercase characters and the uppercase characters in the character inputting screen is achieved by depressing the "SHIFT" key, when the characters are to be inputted from the touch panel 16a, it is necessary to shift the screen from one to another every time for conducting the changeover between the lowercase character and the uppercase character. For this case, the embodiment of the present invention makes it possible to print such an integrated image, in which the both the lowercase and the uppercase character screens are integrated, onto one page of the paper sheet by conducting the print start operation from the display operating section 16.

At first, when the user depress the start key 16e, etc., displayed on the display operating section 16 in the states shown in FIG. 10a and FIG. 10b, as shown in FIG. 10c, the controlling section makes the touch panel 16a display a screen, for requesting the user to determine whether or not the printing operation should be implemented by integrating the two screen images, onto touch panel 16a.

When the user instructs that the printing operation should be implemented by integrating the two screen images, as shown in FIG. 10d, the controlling section makes the touch panel 16a display a screen, for requesting the user to select a desired paper size of the operating use print product, onto touch panel 16a. Successively, when the user selects the desired paper sheet (preferably, a paper sheet having a size larger than that of the screen currently displayed), and depresses the start key 16e, etc., the controlling section (image processing chip 21) creates an integrated screen image in which the selected two screen images are integrated into one page of the paper sheet (herein, the two screen images are respectively arranged at upper and lower areas of an A4 size paper sheet), so as to synthesize the pattern with the integrated screen image above-created. Still successively, the controlling section makes the printer engine 23 print the synthesized image onto the paper sheet concerned, so as to output a operating use print product 41 shown in FIG. 10e. In this connection, although there has been described such the case that the two screen images, including the character inputting screen for lowercase characters and the other character inputting screen for uppercase characters, are integrated into one page of the paper sheet in the aforementioned embodiment, it is needless to say that the number of screen images to be integrated is not limited to two, but three or more screen images are applicable in the present invention as well.

On the other hand, when the user instructs that the printing operation should not be implemented by integrating the two screen images, as shown in FIG. 10f, the controlling section makes the touch panel 16a display a screen, for requesting the user to select a desired paper size of the operating use print product, onto touch panel 16a. Successively, when the user selects the desired paper sheet (preferably, a paper sheet having a size larger than that of the screen currently displayed), and depresses the start key 16e, etc., the controlling section (image processing chip 21) creates two selected screen images each of which is to be arranged onto one page of paper sheet, so as to synthesize the pattern with each of the two selected screen images above-created. Still successively, the controlling section makes the printer engine 23 print the two synthesized images onto the two paper sheet, respectively, so as to output two sheets of operating use print product 41 shown in FIG. 10g.

Further, the controlling section stores the selected screen and the key of the concerned screen into the nonvolatile RAM 13b, while correlating them with the positional information of each key on the operating use print product 41.

Still successively, the user selects an option of each of functions by using the electronic pen 30 for the operating use print product 41 shown in FIG. 10e or 10g. For instance, when the user touches the image area of "A" with the electronic pen 30 as shown in FIG. 11a, the electronic pen 30 specifies the coordinate (X, Y) based on the pattern printed onto the image area concerned so as to transmit the coordinate (X, Y) to the image forming apparatus 10. Receiving the coordinate (X, Y) through the electric pen communication module 17, the image forming apparatus 10 recognizes the concerned coordinate (X, Y) as the image area of "A" of the table stored in the nonvolatile RAM 13b, and accordingly, establishes the setting status same as that to be established at the time when the key "A" is designated from the uppercase character inputting screen displayed under the touch panel 16a.

On the other hand, when the user touches the image area of "b" with the electronic pen 30 as shown in FIG. 11b, the image forming apparatus 10 receives the coordinate (X, Y) through the electric pen communication module 17 as well as the above. Then, the image forming apparatus 10 recognizes the concerned coordinate (X, Y) as the image area of "b" of the table stored in the nonvolatile RAM 13b, and accordingly, establishes the setting status same as that to be established at the time when the key "b" is designated from the uppercase character inputting screen displayed under the touch panel 16a.

In this connection, according to the abovementioned embodiment, when the uppercase character (or the lowercase character) is inputted in such a state that the lowercase character inputting screen (or the uppercase character inputting screen) is currently displayed onto the touch panel 16a, the screen to be displayed under the touch panel 16a is shifted from the lowercase character inputting screen to the uppercase character inputting screen (or from the uppercase character inputting screen to the lowercase character inputting screen). However, the screen to be displayed under the touch panel 16a is not necessary changed.

Next, referring to the flowcharts shown in FIG. 12 through FIG. 13b, the abovementioned consecutive operations for setting the function will be detailed in the following. The flowchart shown in FIG. 12 indicates the consecutive operations to be conducted until the operating use print product 41 is printed, while, FIG. 13a and FIG. 13b show flowcharts indicating the procedures for using the operating use print product 41 to operate the image forming apparatus 10.

Figure 12:
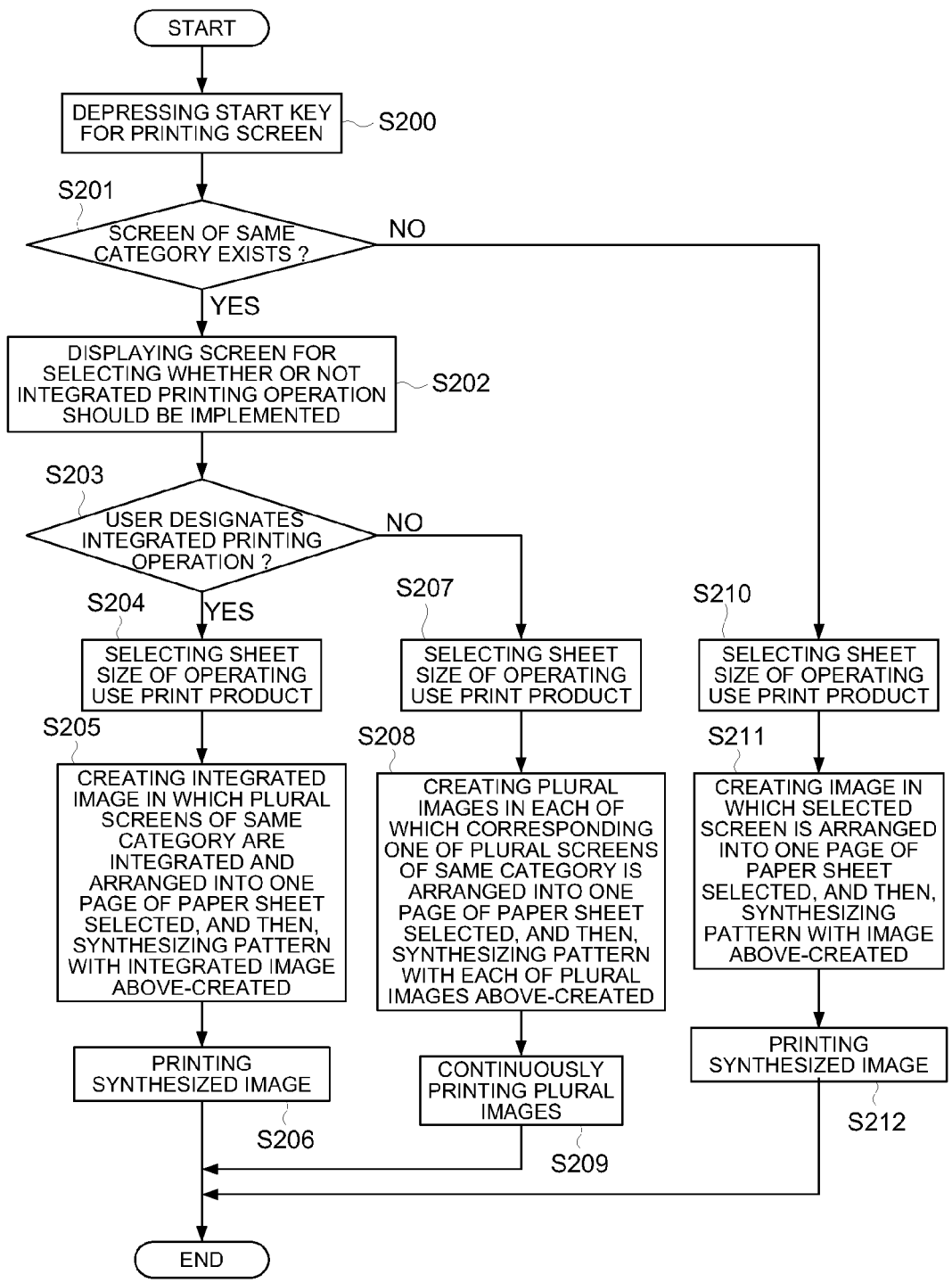
FIG. 12 shows a flowchart indicating operations to be conducted in an image forming apparatus (procedures for creating an operating use print product on which two screen images are printed), embodied in the present invention.
Figure 13A:
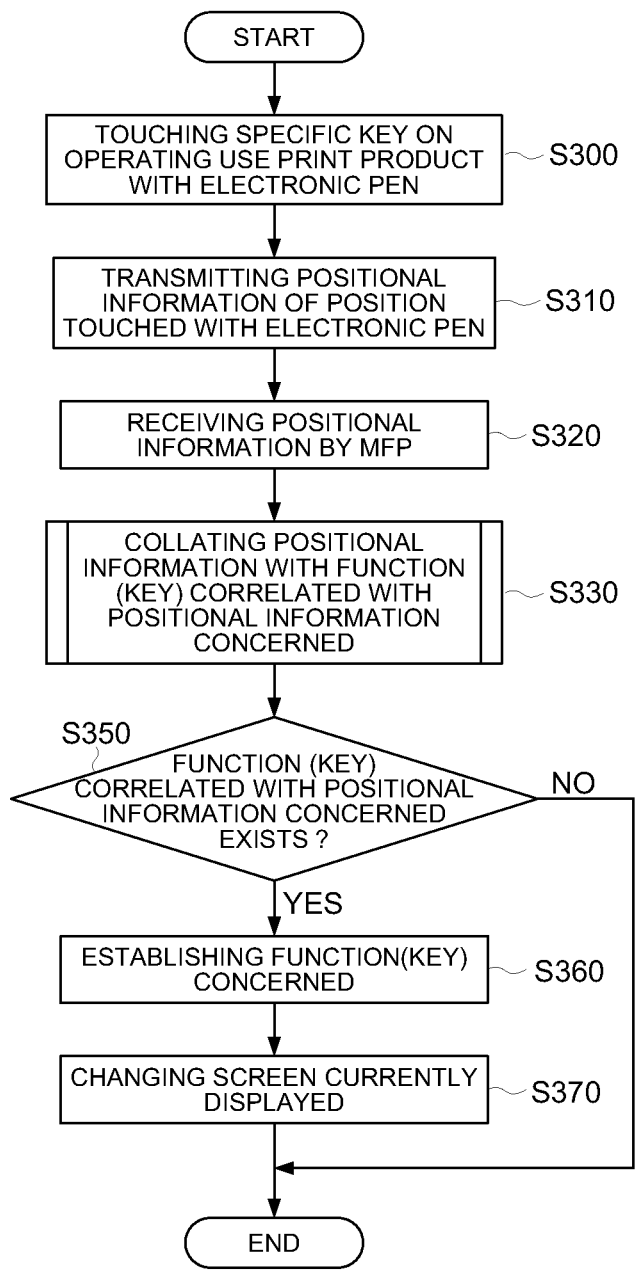
FIG. 13a and FIG. 13b show flowcharts indicating operations to be conducted in an image forming apparatus (procedures for operating an image forming apparatus by using an operating use print product on which two screen images are printed), embodied in the present invention.
Figure 13B:
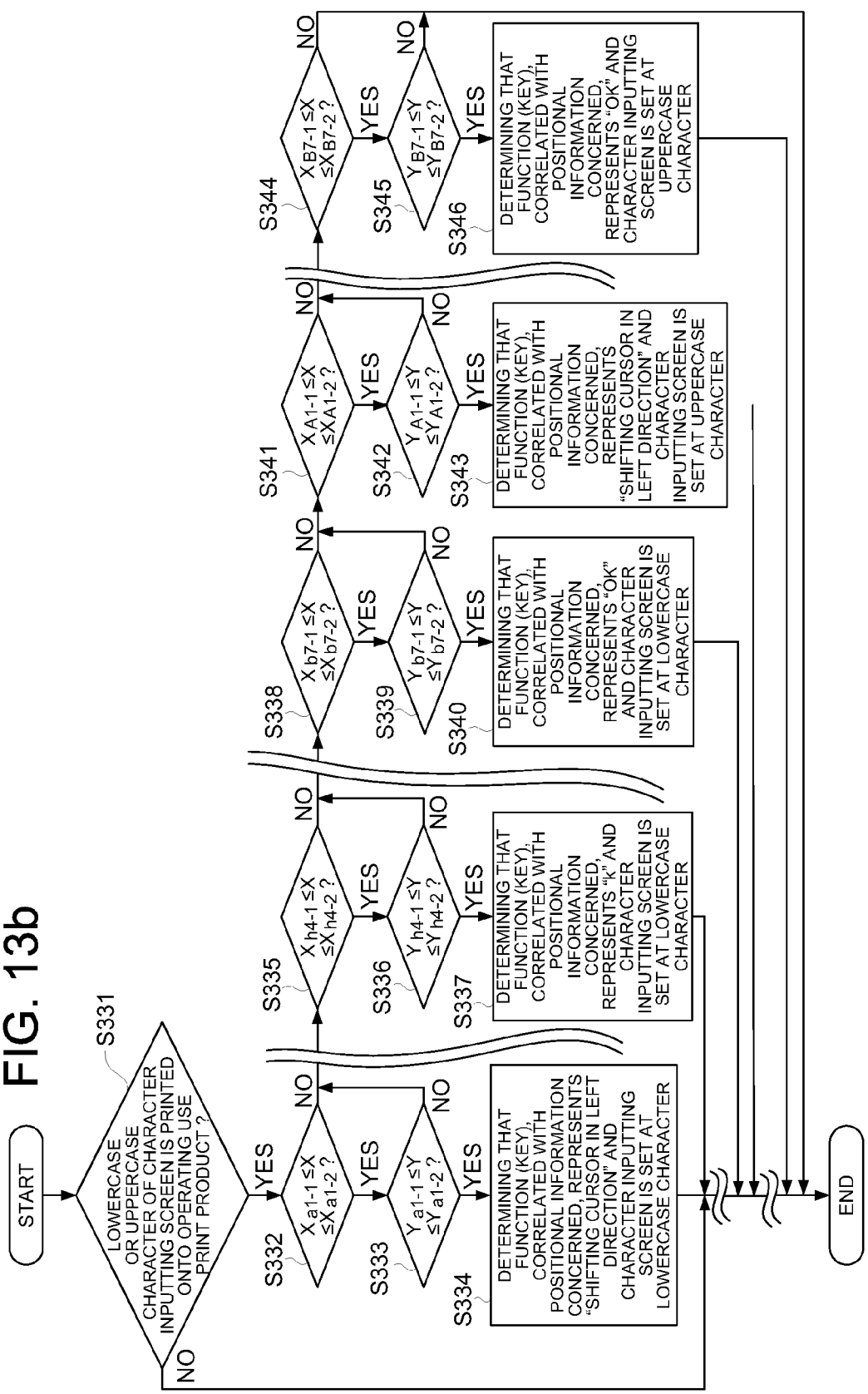

At first, as shown in FIG. 12, when the user depresses the start key 16e, etc. of the display operating section 16 (Step S200), the controlling section determines whether or not the screen of the same category exists (Step S201).

Successively, when determining that the screen of the same category (for instance, the uppercase character inputting screen and the lowercase character inputting screen, etc.) exists (Step S201; Yes), the controlling section makes the touch panel 16a display such a screen from which the user selects whether or not the integrated printing operation of the concerned screens should be implemented, thereon (Step S202), so as to determine whether or not the user designates the integrated printing operation (Step S203).

Still successively, when determining that the user designates the integrated printing operation of the concerned screens (Step S203; Yes), the controlling section makes the touch panel 16a display such a screen from which the user selects a sheet size of the operating use print product (Step S204). When the user selects a specific paper sheet, the controlling section (image processing chip 21) creates an integrated image in which plural screens of the same category are integrated and arranged into one page of the specific paper sheet concerned, and then, synthesizes the pattern with the integrated image above-created (Step S205). Then, the controlling section makes the printer engine 23 print the synthesized image onto the specific paper sheet (Step S206).

On the other hand, when determining that the user does not designate the integrated printing operation of the concerned screens (Step S203; No), the controlling section makes the touch panel 16a display such a screen from which the user selects a sheet size of the operating use print product (Step S204). When the user selects a specific paper sheet, the controlling section (image processing chip 21) creates plural images in each of which corresponding one of plural screens of the same category is arranged into one page of the specific paper sheet selected, and then, synthesizes the pattern with each of the plural images above-created (Step S208). Then, the controlling section makes the printer engine 23 print each of the synthesized images onto the specific paper sheet (Step S209).

Returning to Step S201, when determining that the screen of the same category does not exist (Step S201; No), the controlling section makes the touch panel 16a display such a screen from which the user selects a sheet size of the operating use print product (Step S210). When the user selects a specific paper sheet, the controlling section (image processing chip 21) creates an image in which the selected screen is arranged into one page of the specific paper sheet selected, and then, synthesizes the pattern with the image above-created (Step S211). Then, the controlling section makes the printer engine 23 print the synthesized image onto the specific paper sheet (Step S212).

Next, as shown in FIG. 13a, the user takes out the operating use print product 41 from the image forming apparatus 10 so as to touch the key of the operating use print product 41 with the electronic pen 30 in the place at which the communication module 34 of the electronic pen 30 can communicate with the electric pen communication module 17 of the image forming apparatus 10 (Step S300).

In the electronic pen 30, when the pen pressure detecting sensor 37 detects a touching action, the CPU 31 recognizes the pattern read by the image sensor 36, so as to specify the touched position on the operating use print product 41 from the recognized pattern. Then, the CPU 31 transmits positional information of the touched position to the image forming apparatus 10 through the communication module 34 (Step S310), so that the image forming apparatus 10 receives the positional information through the electric pen communication module 17 (Step S320).

Successively, the controlling section of the image forming apparatus 10 collates the function (key) related to the positional information received in the above (Step S330). Referring to the flowchart shown in FIG. 13b, the operations to be conducted in Step S330 will be detailed in the following.

At first, the controlling section determines whether or not an uppercase character or a lowercase character, which is to be displayed on the character inputting screen, is printed onto the operating use print product 41 (Step S331). When determining that neither the uppercase character nor the lowercase character is printed onto the operating use print product 41 (Step S331; No), the controlling section finalizes the processing, since it is impossible to correlate the positional information with the function (key).

When determining that the uppercase character or the lowercase character is printed onto the operating use print product 41 (Step S331; Yes), the controlling section determines whether or not the X coordinate value of the positional information received is in a range of $X_{a1-1}$-$X_{a1-2}$ (Step S332). When determining that the X coordinate value is in a range of $X_{a1-1}$-$X_{a1-2}$ (Step S332; Yes), the controlling section further determines whether or not the Y coordinate value of the positional information received is in a range of $Y_{a1-1}$-$Y_{a1-2}$ (Step S333). When determining that both the X coordinate value and the Y coordinate value are in ranges of $X_{a1-1}$-$X_{a1-2}$ and $Y_{a1-1}$-$Y_{a1-2}$, respectively, (Step S332 and Step S333; Yes), referring to the table stored in advance, the controlling section determines that the function (key) correlated with the positional information concerned represents "SHIFTING CURSOR IN LEFT DIRECTION" (Step S334).

When determining that the X coordinate value or the Y coordinate value is not in a range of $X_{a1-1}$-$X_{a1-2}$ or $Y_{a1-1}$-$Y_{a1-2}$ (Step S332 or Step S333; No), the controlling section repeats the same processing as abovementioned, so as to determine whether or not the X coordinate value of the positional information received is in a range of $X_{h4-1}$-$X_{h4-2}$ (Step S335). When determining that the X coordinate value is in a range of $X_{h4-1}$-$X_{h4-2}$ (Step S335; Yes), the controlling section further determines whether or not the Y coordinate value of the positional information received is in a range of $Y_{h4-1}$-$Y_{h4-2}$ (Step S336). When determining that both the X coordinate value and the Y coordinate value are in ranges of $X_{h4-1}$-$X_{h4-2}$ and $Y_{h4-1}$-$Y_{h4-2}$, respectively, (Step S335 and Step S336; Yes), referring to the table stored in advance, the controlling section determines that the function (key) correlated with the positional information concerned represents "k" (Step S337).

Further, the controlling section repeats the same processing as abovementioned, so as to determine whether or not the X coordinate value of the positional information received is in a range of $X_{b7-1}$-$X_{b7-2}$ (Step S338). When determining that the X coordinate value is in a range of $X_{b7-1}$-$X_{b7-2}$ (Step S338; Yes), the controlling section further determines whether or not the Y coordinate value of the positional information received is in a range of $Y_{b7-1}$-$Y_{b7-2}$ (Step S339). When determining that both the X coordinate value and the Y coordinate value are in ranges of $X_{b7-1}$-$X_{b7-2}$ and $Y_{b7-1}$-$Y_{b7-2}$, respectively, (Step S338 and Step S339; Yes), referring to the table stored in advance, the controlling section determines that the function (key) correlated with the positional information concerned represents "OK" (Step S340).

Still further, the controlling section repeats the same processing as abovementioned, so as to determine whether or not the X coordinate value of the positional information received is in a range of $X_{A1-1}$-$X_{A1-2}$ (Step S341). When determining that the X coordinate value is in a range of $X_{A1-1}$-$X_{A1-2}$ (Step S341; Yes), the controlling section further determines whether or not the Y coordinate value of the positional information received is in a range of $Y_{A1-1}$-$Y_{A1-2}$ (Step S342). When determining that both the X coordinate value and the Y coordinate value are in ranges of $X_{A1-1}$-$X_{A1-2}$ and $Y_{A1-1}$-$Y_{A1-2}$, respectively, (Step S341 and Step S342; Yes), referring to the table stored in advance, the controlling section determines that the function (key) correlated with the positional information concerned represents "SHIFTING CURSOR IN LEFT DIRECTION" (Step S343).

Yet further, the controlling section repeats the same processing as abovementioned, so as to determine whether or not the X coordinate value of the positional information received is in a range of $X_{B7-1}$-$X_{B7-2}$ (Step S344). When determining that the X coordinate value is in a range of $X_{B7-1}$-$X_{B7-2}$ (Step S344; Yes), the controlling section further determines whether or not the Y coordinate value of the positional information received is in a range of $Y_{B7-1}$-$Y_{B7-2}$ (Step S345). When determining that both the X coordinate value and the Y coordinate value are in ranges of $X_{B7-1}$-$X_{B7-2}$ and $Y_{B7-1}$-$Y_{B7-2}$, respectively, (Step S344 and Step S345; Yes), referring to the table stored in advance, the controlling section determines that the function (key) correlated with the positional information concerned represents "OK" (Step S346).

Returning to the flowchart shown in FIG. 13a, the controlling section determines whether or not the function (key) correlated with the received positional information exists, as the result of the collating operation (Step S350). When determining that no function (key) correlated with the received positional information exists (Step S350; No), the controlling section finalizes the processing (END). When determining that the function (key) correlated with the positional information concerned exists (Step S350; Yes), the controlling section establishes the own apparatus status being substantially same as that established by depressing the key of the concerned function currently displayed on the touch panel 16a of the display operating section 16 (Step S360), and makes the setting instruction status, with respect to the screen (herein, the lowercase character inputting screen or the uppercase character inputting screen) currently displayed on the touch panel 16a, same as that to be displayed at the time when the concerned function (key) is actually selected from the touch panel 16a (Step S370).

As described in the foregoing, according to the present embodiment, since the function (key) can be establish by employing the electronic pen 30 and the operating use print product 41 onto which the plural screens belonging to the same category are printed, it becomes possible for the user to continuously conduct the operations, which have conventionally require to change the plural screens from one to another on the touch panel 16a, on the single paper sheet of operating use print product 41, resulting in further improvement of the maneuverability (and/or usability) of the image forming apparatus 10.

In this connection, the scope of the present invention is not limited to the above-exemplified embodiment. Modifications and additions made by a skilled person without departing from the spirit and scope of the invention shall be included in the scope of the present invention.

For instance, although the screen to be displayed on the touch panel 16a and the image to be printed onto the operating use print product 41 are the same as each other in the embodiment described in the foregoing, it is also applicable that the layout and the reduced scale of the printed image are changeable as needed, as far as the printed image maintains the configuration of the screen to be displayed on the touch panel 16a.

Further, although the aforementioned embodiment is so constituted that the synthesized image, in which the pattern is synthesized with the screen image selected by the user, is printed onto the paper sheet, it is also applicable that the system is so constituted that the image data of the synthesized image is outputted to such an apparatus that is provided with a displaying function, such as an electric paper sheet, etc., so as to display the synthesized image onto the display screen of the apparatus concerned, in order to make it possible for the user to establish a desired function from the display screen.

Still further, although the aforementioned embodiment is exemplified as the image forming apparatus 10 for which the user establishes the function, it is needless to say that the present invention is also applicable for an arbitral kind of apparatus that requires the user to shift plural screens from one to another when setting a specific function, as well.

The present invention is available for an image forming apparatus, which is capable of outputting an operating use print product, and an operation controlling method, which employs the image forming apparatus concerned.

According to the present invention, it becomes possible to improve maneuverability and usability of an apparatus.

This is because, an image forming apparatus, embodied in the present invention, forms an image onto which the screen displayed on the display section is to be arranged, and then, forms a synthesized image in which positional information for specifying a position of each of the keys included in the screen is synthesized with the above-created image, which is to be printed onto a paper sheet, so that, receiving the positional information representing the position on the paper sheet, the image forming apparatus specifies a key corresponding to the positional information received, and establishes a status of the own apparatus, being same as that established by designating the specific key from the screen.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus, comprising:
a display displaying a setting-screen, selected by a user, from a plurality of setting-screens, each setting-screen being configured to set functions of the image forming apparatus;
a controller; and
a storage,
wherein the controller:
causes generation of a first image of the setting-screen selected by the user from the plurality of setting screens for setting the functions of the image forming apparatus,
causes generation of a second image that includes the first image of the setting screen selected by the user and an image of first position detecting symbols, the first position detecting symbols specifying positions of keys corresponding to the setting-screen selected by the user;
makes the storage store the keys corresponding to the setting-screen selected by the user, and a table in which the keys and corresponding position information are correlated; and
causes printing of the second image onto a paper sheet, and
wherein, in a case where a key is selected from the paper sheet on which the second image is printed, the controller:
acquires the position information corresponding to the key selected from the paper sheet, by referring to the table; and
sets at least one of the functions of the image forming apparatus based on the key selected from the paper sheet.

2. The image forming apparatus of claim 1, wherein the setting-screen is a first setting-screen, and the controller:
determines whether a second setting-screen, which belongs to a same category as that of the first setting-screen, exists;
causes generation of a third image in which the first setting-screen and the second setting-screen are integrally arranged, when the second setting-screen exists;
causes generation of the second image that includes the third image and an image of second position detecting symbols, the second position detecting symbols specifying positions of keys corresponding to the first and second setting-screens; and
causes printing of the second image onto the paper sheet.

3. The image forming apparatus of claim 2,
wherein the first setting-screen is a small letter inputting screen, while the second setting-screen is a capital letter inputting screen.

4. The image forming apparatus of claim 1, wherein the setting-screen is a first setting screen, the paper sheet is a first paper sheet, and the controller:
determines whether a second setting-screen, which belongs to a same category as that of the first setting-screen, exists;
causes generation of a third image of the second setting-screen, when the second setting-screen exists;
causes generation of a fourth image that includes the third image and an image of a third position detecting sym-
bols, the third position detecting symbols specifying positions of keys corresponding to the second setting-screen; and
causes printing of both the second image on the first paper sheet and the third image on a second paper sheet.

5. The image forming apparatus of claim 1, wherein, in a case where the key is selected from the paper sheet on which the second image is printed, the controller:
determines whether the setting-screen, corresponding to the second image, is displayed on the display;
sets the at least one of the functions of the image forming apparatus based on the key selected from the paper sheet, when the setting-screen, corresponding to the second image, is displayed on the display; and
disables setting the at least one of the functions of the image forming apparatus based on the key selected from the paper sheet, when the setting-screen, corresponding to the second image, is not displayed on the display.

6. The image forming apparatus of claim 1, wherein the position detecting symbols constitute a pattern, which is recognizable using an electronic pen.

7. The image forming apparatus of claim 1,
wherein a configuration of the first image, included in the second image to be printed onto the paper sheet, is the same as the setting-screen selected by the user.

8. A method of controlling an image forming apparatus that is capable of communicating with an electronic pen, the method comprising:
selecting a setting-screen from a plurality of setting-screens for setting functions of the image forming apparatus;
displaying the setting-screen on a display;
generating a first image of the at least one setting-screen;
generating a second image that includes the first image of the setting screen selected by the user and an image of first position detecting symbols, the first position detecting symbols specifying positions of keys corresponding to the selected setting-screen;
storing the keys corresponding to the setting-screen selected by the user, and a table in which the keys and corresponding position information are correlated;
printing the second image onto a paper sheet; and
in a case where a key is selected from the paper sheet on which the second image is printed:
acquiring, using the electronic pen, positional information representing a position on the paper sheet based on the position detecting symbols;
identifying the key selected on the paper sheet based on the position information stored in the table; and
setting at least one of the functions of the image forming apparatus based on the key selected from the paper sheet.

9. The method of claim 8, wherein, the setting-screen is a first setting-screen, and the method further comprises:
determining whether a second setting-screen, which belongs to a same category as that of the first setting-screen, exists;
generating a third image in which the first setting-screen and the second setting-screen are integrally arranged, when the second setting-screen exists;
generating the second image that includes the third image and an image of second position detecting symbols, the second position detecting symbols specifying positions of keys corresponding to the first and second setting-screens; and
printing the second image onto the paper sheet.

10. The method of claim 8, wherein the setting-screen is a first setting-screen, the paper sheet is a first paper sheet, and the method further comprises:
- determining whether a second setting-screen, which belongs to a category same as that of the first setting-screen, exists;
- generating a third image of the second setting-screen, when the second setting-screen exists;
- generating a fourth image that includes the third image and an image of third position detecting symbols, the third position detecting symbols specifying positions of keys corresponding to the second setting-screen; and
- printing both the second image on the first paper sheet and the third image on a second paper sheet.

11. The method of claim 8, further comprising, in a case where the key is selected from the paper sheet on which the second image is printed:
- determining whether the first setting-screen, corresponding to the second image, is displayed on the display;
- setting the at least one of the functions of the image forming apparatus based on the key selected from the paper sheet; when the setting-screen, corresponding to the second image, is displayed on the display; and
- disabling setting the at least one of the functions of the image forming apparatus based on the key selected from the paper sheet, when the setting-screen, corresponding to the second image, is not displayed on the display.

12. The method of claim 8, wherein the position detecting symbols constitute a pattern, which is recognizable using the electronic pen.

13. The method of claim 8,
wherein a configuration of the first image, included in the second image to be printed onto the paper sheet, is the same as the selected setting-screen.

14. The method of claim 8,
wherein the first setting-screen is a small letter inputting screen, while the second setting-screen is a capital letter inputting screen.

15. A non-transitory computer-readable medium for storing instructions for causing an image forming apparatus to execute a method, comprising:
- selecting at least one setting-screen form a plurality of setting-screens for setting functions of the image forming apparatus;
- displaying the selected setting-screen;
- generating a first image of the setting-screen;
- generating a second image that includes the first image of the setting screen selected by the user and an image of position detecting symbols, the position detecting symbols specifying positions of keys corresponding to the at least one setting-screen;
- storing the keys corresponding to the setting-screen selected by the user, and a table in which the keys and the corresponding position information are correlated;
- printing the second image onto a paper sheet; and
- in a case where a key is selected from the paper sheet on which the second image is printed:
  - acquiring, using the electronic pen, positional information representing a position on the paper sheet based on the position detecting symbols;
  - identifying the key selected on the paper sheet based on the positional information stored in the table; and
  - setting at least one of the functions of the image forming apparatus based on the key selected from the paper sheet.

16. The non-transitory computer-readable medium of claim 15, wherein the setting-screen is a first setting-screen and the method further comprises:
- determining whether a second setting-screen, which belongs to a same category as that of the first setting-screen, exists;
- generating a third image in which the first setting-screen and the second setting-screen are integrally arranged, when the second setting-screen exists;
- generating the second image that includes the third image and an image of second position detecting symbols, the second position detecting symbols specifying positions of keys corresponding to the first and second setting-screens; and
- printing the second image onto the paper sheet.

17. The non-transitory computer-readable medium of claim 15, wherein the setting-screen is a first setting-screen, the paper sheet is a first paper sheet, and the method further comprises:
- determining whether a second setting-screen, which belongs to a same category as that of the first setting-screen, exists;
- generating a third image of the second setting-screen, when the second setting-screen exists;
- generating a fourth image that includes the third image and an image of third position setting symbols, the third position setting symbols specifying positions of keys corresponding to the second setting-screen; and
- printing both the second image on the first paper sheet and the third image on a second paper sheet.

18. The non-transitory computer readable medium of claim 15, wherein the method further comprises, in a case where the key is selected from the paper sheet on which the second image is printed:
- acquiring position information specified by the position detecting symbols;
- identifying the key correlated with the position information by referring to the table;
- determining whether the first setting-screen, corresponding to the second image, is displayed on the display;
- setting the at least one of the functions of the image forming apparatus based on the key selected from the paper sheet, when the setting-screen, corresponding to the second image, is displayed on the display; and
- disabling setting the at least one of the functions of the image forming apparatus based on the key selected from the paper sheet, when the setting-screen, corresponding to the second image, is not displayed on the display.

19. The non-transitory computer-readable medium of claim 15, wherein the position detecting symbols constitute a pattern, which is recognizable using an electronic pen.

20. The non-transitory computer-readable medium of claim 15,
wherein a configuration of the first image, included in the second image to be printed onto the paper sheet, is the same as the selected setting-screen.

21. The non-transitory computer-readable medium of claim 15,
wherein the first setting-screen is a small letter inputting screen, while the second setting-screen is a capital letter inputting screen.

* * * * *